UNITED STATES PATENT OFFICE.

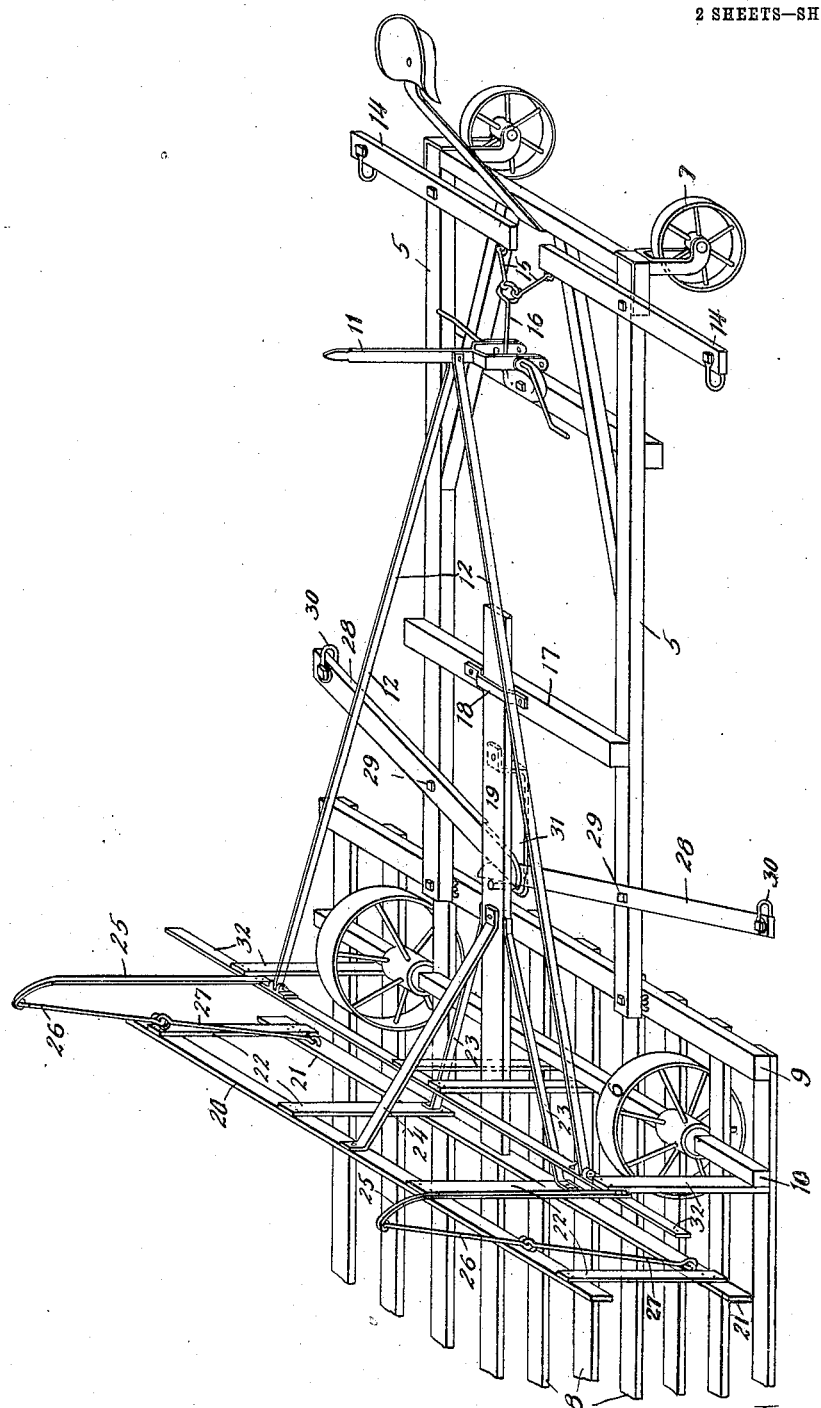

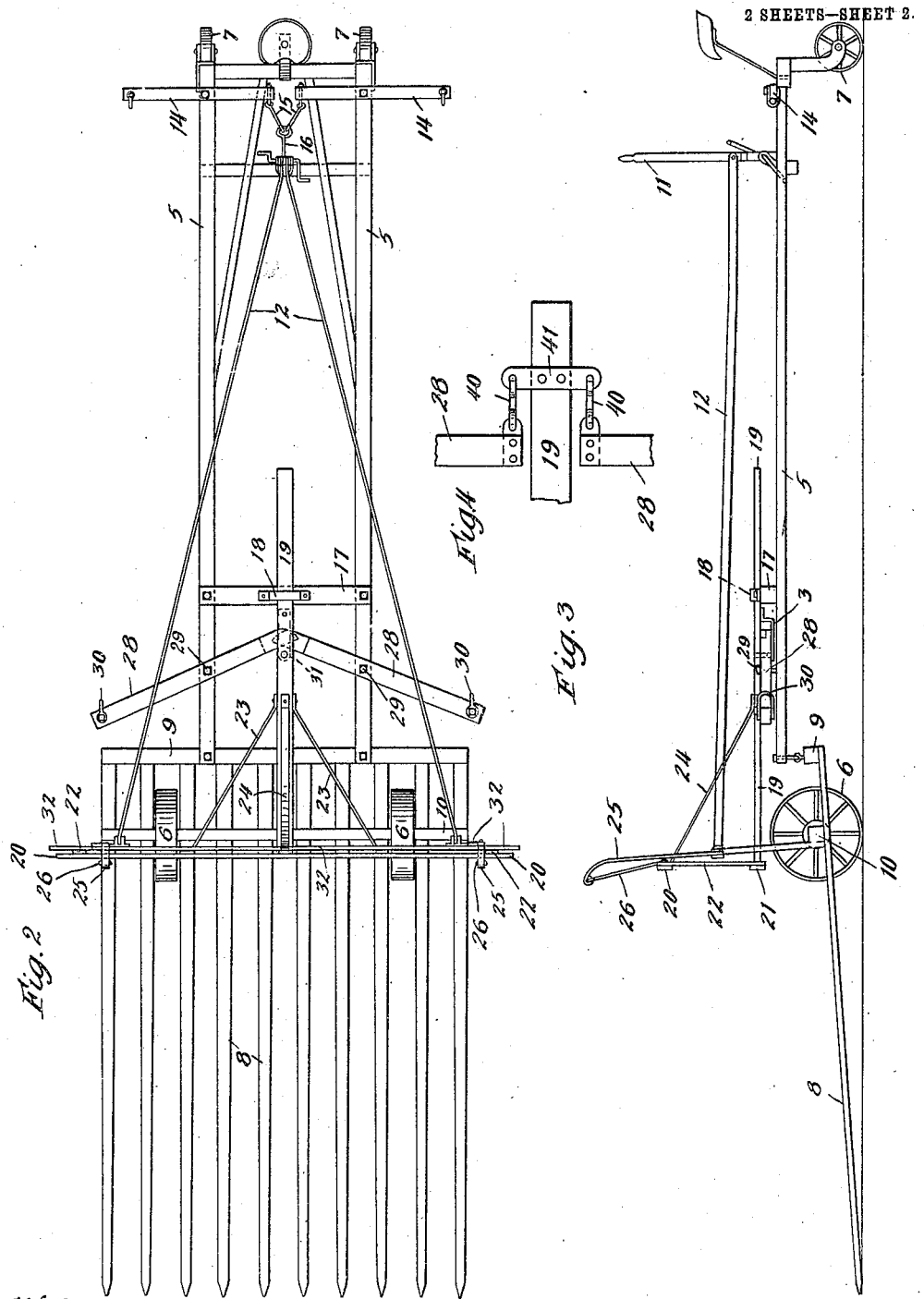

DAVID F. ANDERSON, OF COUNCIL BLUFFS, IOWA, ASSIGNOR TO E. CHILDRENS SONS MANUFACTURING CO., OF COUNCIL BLUFFS, IOWA, A CORPORATION OF IOWA.

PUSH OR SWEEP HAY-RAKE.

No. 836,171.     Specification of Letters Patent.     Patented Nov. 20, 1906.

Application filed January 11, 1906. Serial No. 295,522.

*To all whom it may concern:*

Be it known that I, DAVID F. ANDERSON, a citizen of the United States, residing in Council Bluffs, in the county of Pottawattamie and State of Iowa, have invented a new and useful Improvement in Push or Sweep Hay-Rakes, of which the following is a specification.

This invention relates to the construction of what are known as "sweep" rakes for raking hay and especially to that kind of such rakes wherein the frame is supported upon wheels at both front and rear; and the object of the invention has been to adapt the discharging-head of a companion application, Serial No. 289,884, filed December 1, 1905, to use on rakes of the kind above specified. In said companion application the rake is supported on two wheels and is known as a "two-wheel" rake, and the discharging-head is operated by the horses, the power being taken from the main draft-bars.

In the present case, while the power for operating the head comes primarily from the horses, I take the power to the head from what I call "backing-levers" instead of the draw or draft bars, as in the two-wheel construction. These backing-levers are pivoted upon the main frame, and the horses' collars are hitched to their outer ends, while the inner ends are joined to and actuate a longitudinally-slidable bar, the front end of which carries the discharging-head.

The nature of my invention will be fully understood from the accompanying drawings, in which—

Figure 1 is a perspective of a hay-rake embodying the invention. Fig. 2 is a plan view, and Fig. 3 a side elevation, of the same. Fig. 4 is a detail view of a modified construction of a portion of the rake.

In said drawings, 5 represents the main frame of the rake, supported upon front wheels 6 6 and rear wheels 7 7.

8 8 represent the teeth forming the rake proper, secured together by the cross-bar 9 of the main frame and by the axle 10, the latter being a short distance in front of the cross-bar. The teeth are raised and lowered by the hand-lever 11, the connecting-rods 12 12 and the uprights of the back frame 32 connecting said rods with the rake-teeth.

14 14 are the draft or draw bars, each pivoted on the frame 5 and each connected by links 15 and 16 to the lever 11, so that they may operate said lever in the manner set forth in patent to F. R. Children, now about to be issued.

The frame 5 is provided with a cross-bar 17, upon which is a guide-strip 18, and in this strip is inserted a push-bar 19, arranged longitudinally of the machine and connected at its forward end to the discharging-head. This head may be constructed in any suitable manner, and, as shown, it consists of two horizontal strips 20 and 21, extending across the rake, and vertical strips 22, uniting the the strips 20 and 21. The discharging-head is braced from the push-bar by two horizontal and diagonal braces 23 23, extending from the bar to the strip 21, and a third brace 24, extending from the push-bar upward to the strip 20. The discharging-head is suspended from two uprights 25, the upper ends of which bend over in a forward direction, as plainly shown, the connections to the discharging-head being by means of rods or links 26 and 27, flexibly joined together at their meeting ends and also to the bottom strip 21 of the discharging-head. When the discharging-head is actuated to discharge the load, it is permitted to move a short distance before it begins to rise, by reason of a crook in the upper ends of the standards 25, so that the extent to which it must move upward during the remainder of the actuating movement is materially lessened. This will be understood from the further description given below.

At 28 are two levers which I call "backing-levers." They are pivoted at 29 to the main frame, and their outer ends are provided with loops 30, whereby an attachment may be effected with the horses' collars or pole-straps. The inner ends of these levers 28 may meet and lap by each other under the push-bar 19. The push-bar carries a strap of flat metal 31, bent to form a loop adapted to receive the overlapping ends of the levers 28 and to communicate motion from the levers to the push-bar. The construction is such, it will be seen, that when the horses are backed the levers will be swung on their pivots 29 in such manner as to force the push-bar 19 in a forward direction, and this movement is communicated to the discharging-head, forcing it to discharge the load accumulated on the rake. As already stated, the movement thus given to the discharging-head is first horizontal and then through the arc of a circle.

One of the purposes in view in imparting a bend to the upper ends of the uprights 25 is to allow the discharging-head to be forced back by the hay until the head encounters the upright frame 32, forming the back of the rake, this frame being back of the points from which the discharging-head is suspended. In the swinging movement, too, the joints in the suspension members permit the head to retain its vertical position, so that the lower strip 21 does not force its way under the hay, as it might do if the head were mounted upon rigid arms.

In the modification shown at Fig. 4 I show another method of connecting the backing-levers to the push-bar and in which the levers do not lap by each other, nor are they confined in a guide-loop of any kind. Instead of that construction I connect the levers by links 40 and a cross-piece 41, bolted to the push-bar, the links being joined to the ends of the levers and the cross-piece.

In the operation of the rake the discharging-head is actuated to unload the hay by the backing of the horses, as already explained, and after the discharging operation the head is returned to its normal position automatically as soon as the horses are started forward again by gravity.

I claim—

1. The rake having both forward and rear supporting-wheels, a discharging-head, and pivoted backing-levers located in front of the horses and adapted to be attached to their collars or pole-straps, and a mechanical connection whereby the levers operate the discharging-head.

2. The rake having both forward and rear supporting-wheels, and wherein are combined a discharging-head, and pivoted backing-levers located in front of and adapted to receive the backing-straps of the team, and a mechanical connection from said levers to the discharging-head.

3. The rake having both forward and rear supporting-wheels, and wherein are combined a discharging-head, and pivoted backing-levers, and a push-bar whereby the levers operate the head.

4. The combination of a discharging-head, with a push-bar at right angles thereto, and backing-levers pivoted to the frame and adapted to be operated by the horses, said levers being loosely joined to the push-bar, whereby backward motion of the team forces the discharging-head forward.

5. The combination in a hay-rake, of a discharging-head and backing-levers for operating the head, said levers being located in front of the horses and having means whereby they may be attached to their collars or pole-straps.

6. The combination in a hay-rake, of a discharging-head and backing-levers located in front of the horses and pivoted to the main frame, said levers having means whereby they may be attached to the horses' collars or pole-straps at their outer ends and having their inner ends mechanically connected to the head, whereby the levers operate the head in discharging.

7. The hay-rake having supports bent forward at the top, and a push-off or discharging-head suspended from such supports, in combination with means for swinging the head to discharge the load, said head being suspended from the forwardly-bent ends of the supports whereby the upward movement of the head while discharging is reduced.

DAVID F. ANDERSON.

Witnesses:
T. S. DAVIS,
C. M. OBERHOLTZER.